United States Patent [19]

Cadeddu

[11] 4,274,521
[45] Jun. 23, 1981

[54] SYNCHRONIZED HYDROPNEUMATIC CONTROL OF CLUTCH AND GEARBOX

[75] Inventor: Leonardo Cadeddu, Crema, Italy
[73] Assignee: Benditalia S.p.A., Crema, Italy
[21] Appl. No.: 21,039
[22] Filed: Mar. 16, 1979
[30] Foreign Application Priority Data
Mar. 23, 1978 [IT] Italy ............................. 21540 A/78
[51] Int. Cl.³ ..................... B60K 41/22; F16D 67/00
[52] U.S. Cl. ................................ 192/3.57; 192/3.51; 192/3.63; 60/556; 60/563; 60/574
[58] Field of Search .................... 192/3.54, 3.63, 3.57, 192/3.58, 3.59, 3.51; 91/520; 60/556, 557, 563, 564, 574

[56] References Cited

U.S. PATENT DOCUMENTS

| 2,153,509 | 4/1939 | Rockwell | 192/3.59 |
| 2,753,024 | 7/1956 | Weaving et al. | 192/3.57 |
| 2,753,025 | 7/1956 | Reis | 192/3.57 |
| 2,908,364 | 10/1959 | Alfieri | 192/3.57 |

Primary Examiner—C. J. Husar
Assistant Examiner—Philip W. Thor
Attorney, Agent, or Firm—Paul David Schoenle; Ken C. Decker

[57] ABSTRACT

The object of the invention is a synchronized hydropneumatic control of clutch and gearbox.

In accordance with the invention a hydropneumatic servomotor clutch control has been provided which includes a jack the piston of which is assisted by a pneumatic motor and a master cylinder which feeds the said jack with hydraulic fluid and controls the feed of air to the said motor, characterized in that the control chamber of the said jack is connected to the hydraulic circuit for locking/unlocking the gearbox, the feed to the said circuit being carried out through a valve mounted in the piston. The admission of the hydraulic fluid from the master cylinder having as its effect during a first period the closing of the said valve, thus interrupting the admission of fluid into the said chamber, then the causing of the transfer of the fluid contained in the latter towards the circuit for the gearbox which becomes unlocked in synchronism with the clutch.

Application to controls of clutch and gearbox of vehicles.

4 Claims, 2 Drawing Figures

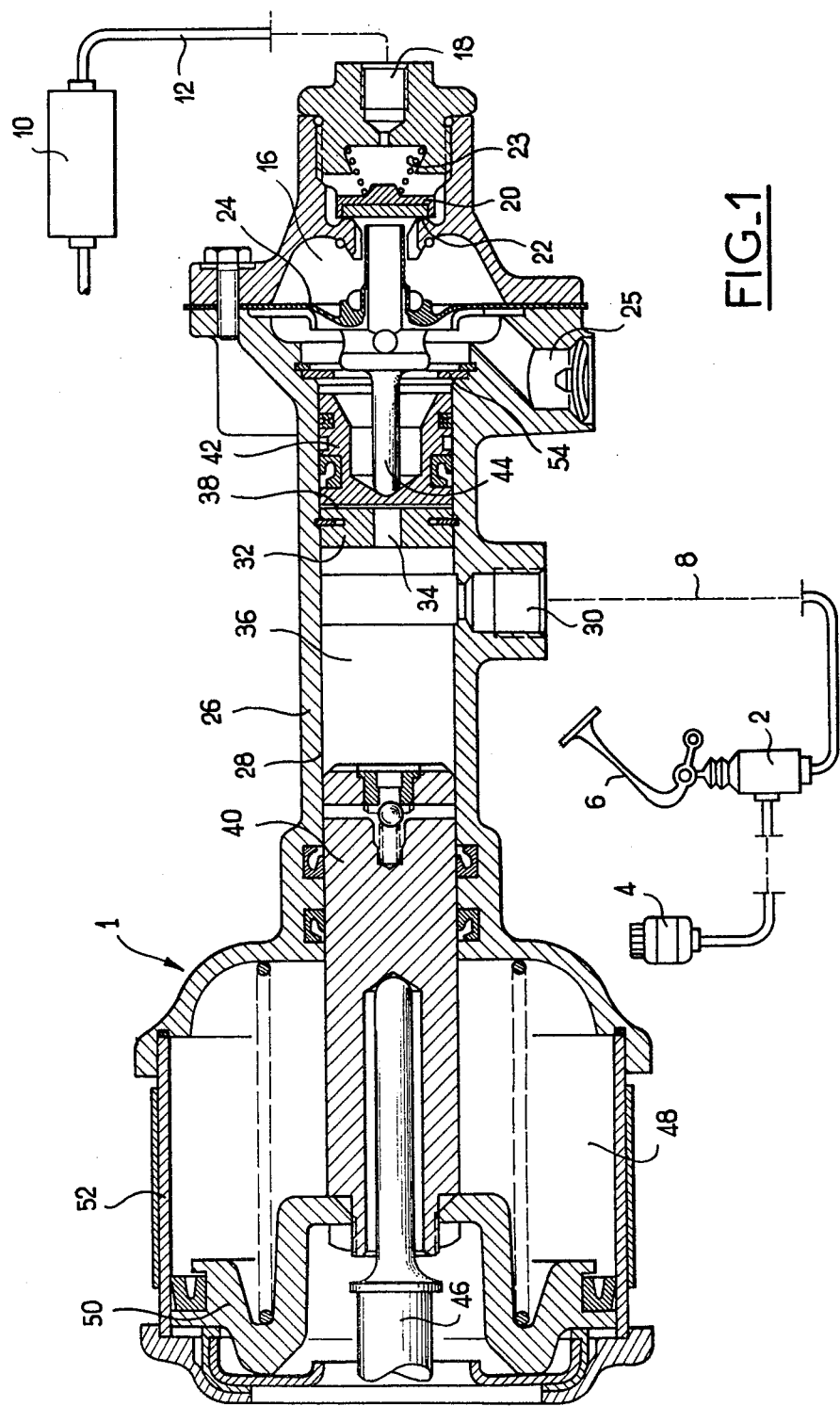
FIG_1

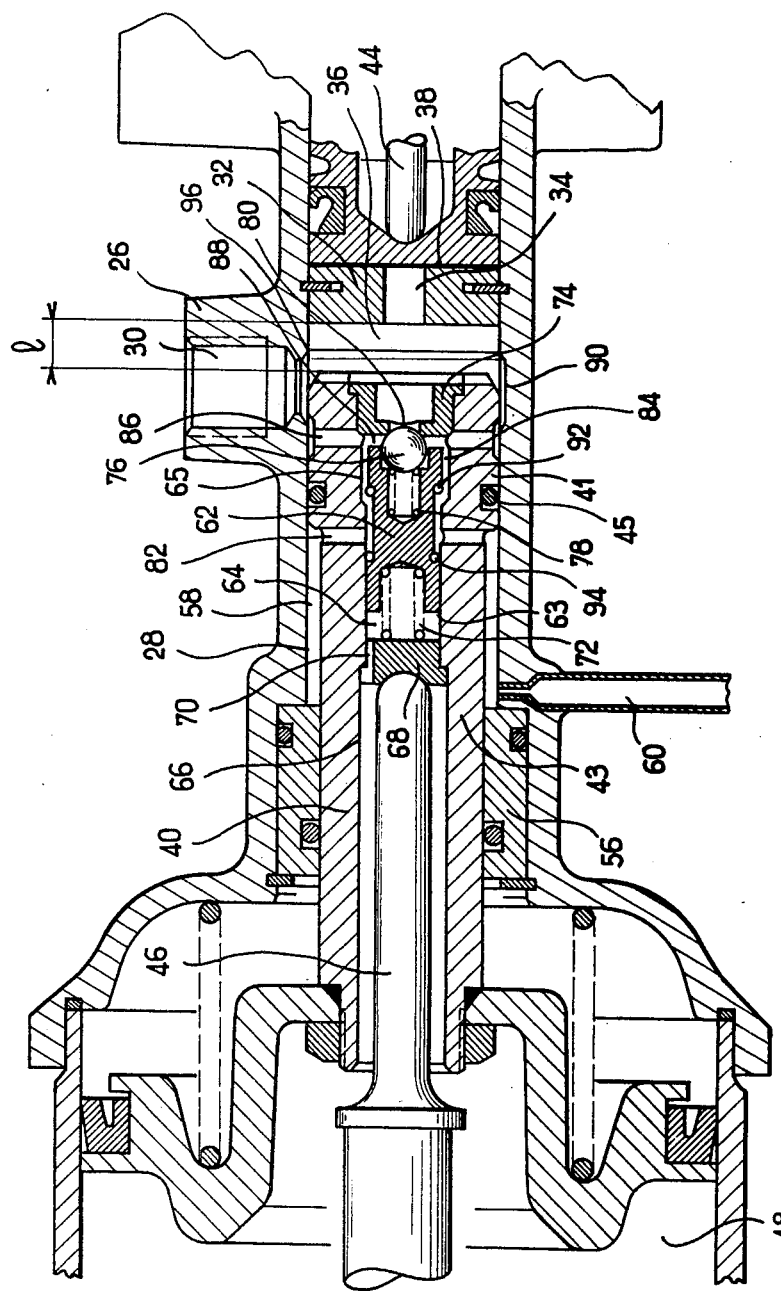
FIG_2

SYNCHRONIZED HYDROPNEUMATIC CONTROL OF CLUTCH AND GEARBOX

The object of the invention is essentially a synchronized hydropneumatic control of clutch and gearbox.

Combined systems have already been proposed for the simultaneous control of the clutch of a vehicle and of the system of locking/unlocking of its gearbox. In general two master cylinders are employed in series or in parallel. The adjustment of such systems is difficult to effect and in the event of failure of the master clutch cylinder there exists a risk of operating the box before obtaining declutching. Moreover the force on the pedal of the vehicle is considerable.

The invention proposes a control of a new type which enables the obtaining of good synchronism between clutch and gearbox. This control likewise enables it to be indicated to the driver that the clutch linings are worn out, thanks to an increase in the force to be exerted on the pedal when this situation occurs.

In accordance with the invention a hydropneumatic servomotor clutch control for a motor vehicle is provided, which includes a hydraulic jack the piston of which is assisted by a pneumatic motor and a master cylinder which feeds the said jack with hydraulic fluid and controls the feed of compressed air to the said motor, characterized in that the control chamber of the said jack is connected moreover to the hydraulic circuit for locking/unlocking the gearbox of the vehicle, the feed to the said gearbox circuit being carried out through a valve mounted in the piston, which at rest frees the flow of hydraulic fluid into a portion of the control chamber defined by the outer surface of the said piston, by a partition through which the said piston slides, and by a shoulder provided at the free end of the piston and sliding in a fluidtight manner in the said bore, the admission of the hydraulic fluid from the master cylinder having as its effect during a first period the closing of the said valve, thus interrupting the admission of fluid into the said chamber, then the causing of the movement of the piston under the action of the hydraulic pressure with release of the pneumatic assistance which causes the reduction in volume of the said portion of the chamber and the transfer of the hydraulic fluid contained in it towards the device for locking/unlocking the gearbox which becomes unlocked in synchronism with the movement of the clutch control rod.

The invention will be better understood from reading the description which is to follow and refers to the attached drawings in which:

FIG. 1 represents in longitudinal section a prior art hydraulic servomotor unit having pneumatic assistance, associated with its circuit represented diagrammatically; and FIG. 2 shows a hydraulic servomotor having hydraulic assistance of the type of that as FIG. 1 including the improvements of the invention.

At the bottom part of FIG. 1 is shown diagrammatically the hydraulic control circuit of a hydropneumatic servomotor designated by the general reference 1. This circuit includes a master cylinder 2 fed by a tank of hydraulic fluid 4 and controlled by a pedal 6. A pipe 8 connects the master cylinder to the servomotor 1. A compressed air reservoir 10 is connected by a pipe 12 to the servomotor.

The pneumatically-assisted hydraulic servomotor 1 is of a conventional type; it comprises a pneumatic feed chamber 16 connected through an orifice 18 to the source of compressed air 10. At the inlet to this chamber 16 is provided a valve 20 for feeding in compressed air held in the rest position against its seat 22 by the action of a spring 23. The chamber 16 is closed by a diaphragm 24 the other face of which is connected to atmosphere by a duct 25. The servomotor 1 has a casing 26 the bore 28 of which is connected through an orifice 30 to the source of hydraulic pressure consisting of the hydraulic pipe 8 and the master cylinder 2. A stop 32 in the form of a bushing fixed in the axial position in the bore 28, with an axial opening 34, divides the bore into two chambers 36 and 38 containing respectively in the bore 28 a piston 40 and a piston 42.

The piston 42 is associated with a pushrod 44, the latter engaging with a hollow stem 21 which controls the feed valve 20, this stem being mounted to slide through the diaphragm 24. The space lying between the piston 42 and the diaphragm 24 communicates with the ambient air through the orifice 25 as has been seen above.

The piston 40, mounted to slide in the chamber 36, engages the output rod 46 of the control device, which in turn is connected to the clutch control lever (not shown). The end of the piston 40 connected to the control rod 46 projects into a third portion of the servomotor 1.

The third portion consists of the pneumatic assistance control chamber 48 having a variable volume fed with compressed air by way of a pipe (not shown) coming from the feed chamber 16. In a conventional fashion this control chamber 48 comprises a moveable wall 50 which can slide in a cylindrical casing 52 and which in its movement carries along the piston 40 and consequently the control rod 46 for manipulating the clutch control lever.

The pneumatically-assisted hydraulic servomotor operates in the following manner: when the clutch pedal 6 is depressed, the hydraulic pressure which prevails in the master cylinder 2 moves the pistons 40 and 42 in opposite directions from one another. The piston 42 separates the flap of the valve 20 from its seat 22 by way of the pushrod 44, thus opening the feed of compressed air. The pressure of compressed air is communicated to the chamber 16, then to the chamber 48 by way of the pipe already mentioned (not shown). The movement of the piston 42 towards the diaphragm 24 is limited by a stop 54.

In the chamber for control of the pneumatic assistance 48, the pneumatic pressure as well as the hydraulic pressure in the bore 28 causes the moveable wall 50 to move, which carries along the piston 40 and the control rod 46 and hence moves the clutch control lever which is associated with it.

When the clutch pedal is released, the pressure decreases in the master cylinder 2, hence likewise in the hydraulic pressure chambers 36 and 38 in the bore 28 of the servomotor. The differential pressure which is exerted on each piston urges them in a movement bringing them together towards the stop 32, the return of the piston 42 causing closure of the compressed air feed valve. The compressed air contained after closure of the valve in the feed chamber 16, the control chamber 48 and the pipe which connects these two chambers is exhausted through the orifice 25 by way of the bore of the hollow stem 21 which controls the valve 20, which stem is mounted as may be seen in FIG. 1, to be separable from the valve head.

FIG. 2 represents the device of the invention, enabling both perfectly synchronized control of the system of locking/unlocking of the gearbox and of the clutch as well as supervision of the wear of the friction material of the said clutch.

The device of the invention is incorporated in the piston of the clutch hydropneumatic control servomotor which actuates the clutch control rod.

In FIG. 2 the pneumatically-assisted hydraulic servomotor is represented in the rest position, the clutch (not shown) being provided with a new friction material without any wear.

The piston 40 has at its free end a first section 41 mounted to slide in the bore 28, and a second section 43 of diameter slightly less than the diameter of the bore 28 sliding in a cylindrical bearing 56 which forms a partition mounted immovably in a bore in the casing 26. The annular gap defined between the bore 28, the outer diameter of the second section 43 of the piston 40, the bearing 56 and the shoulder formed on the piston 40 between the first and second sections, forms a hydraulic pressure chamber 58 connected through the outside pipe 60 to the master cylinder of the gearbox locking system (not shown). Oil tightness between the chambers 58 and 36 within the bore 28 is ensured by a gland 45.

The piston 40 has an internal bore along the whole of its length divided into two portions of bore 64 and 66 separated by a bushing 68 which comes to a stop against a shoulder formed at the junction between the two portions of the bore. The bushing 68 carries a groove 70 which forms a compensation orifice the role of which will appear later in the description of the operation.

The portion of bore 66 receives one end of the control rod 46 which comes to a stop against the bushing 68.

The portion of bore 64 receives a plunger 62, resilient means consisting of a spring 72 being provided between the bush 68 and the plunger 62 in order to apply the plunger toward a collar 74 which is engaged in the front face of the piston. The plunger 62 includes a blind bore for the seating of a ball 76 and a spring 78 which applies the ball against the mouth of an orifice 80 in the collar 74.

The plunger 62 includes in its intermediate middle portion a slight reduction in diameter with respect to the equal areas of its two ends. This middle portion of slightly reduced diameter is defined axially on opposite sides by two annular grooves which receive two sealing rings 92 and 94.

The portion of bore 64 comprises a first section 63 in which slides the head of the plunger 62 located next to the control rod 46 and a second section 65 of slightly larger diameter which forms round the plunger 62 an annular chamber 84 which extends into the first section of the bore 64 thanks to the reduction of the area of the plunger in its middle portion.

This annular chamber 84 communicates with the annular chamber 58 lying between the piston 40 and the casing 26 through one or more radial orifices 82.

On the other hand the annular chamber 84 communicates with the inlet orifice 30 for the hydraulic fluid by way of holes 86 drilled radially and by a wide annular recess 90 of small depth machined in the bore 28 at the level of the inlet orifice for the hydraulic fluid 30. Finally, passages 88 which exist at the end of the plunger 62 connect the annular chamber 84 to the ball 76 of the valve for a purpose which will be explained below with the description of the operation of the device of the invention.

In the position of rest the piston 40 is in the position represented in FIG. 2, its free end 41 lying at a distance "1" from the axial stop 32. This distance "1" is chosen to be equal to the maximum wear that is tolerated in the friction material.

In this rest position the locking/unlocking system of the gearbox is in the locking position. The locking/unlocking system (not shown) is a system of conventional type and is designed to prevent any gear change in the gear box unless a predetermined quantity of fluid under pressure via pipe 60 has been admitted to the locking/unlocking mechanism. It will be appreciated that, in this respect, this system can be considered merely as a utilizing circuit communicating with pipe 60.

When the clutch pedal 6 is actuated a hydraulic pressure is communicated to the chambers 36 and 38 through the fluid inlet orifice 30. The plunger 62 is subjected on the one hand to the atmospheric pressure over its face located near the output rod 46 of the device by way of the axial groove 70 in the bushing 68 and on the other hand to the hydraulic control pressure communicated through the orifice 30, the recess 90 and the radial orifices 86. Under the influence of the resultant differential pressure the plunger 62 is moved against the action of the spring 72 relatively with respect to the piston 40 in the direction of a movement towards the bushing 68. The sealing ring 92 comes and engages in an oiltight manner in the section 63 of the bore 64 and closes the communication between the fluid inlet orifice 30 and the outside pipe 60 which connects the servomotor to the locking/unlocking system of the gearbox.

The pneumatically-assisted clutch servomotor and the locking/unlocking system of the gearbox are dimensioned in such a way that at the instant when the pressure reaches the pressure of closure of the communication between the orifice 30 and the pipe 60 these two devices are still in the position of rest, that is to say, the servomotor still does not move the output rod 46 and the locking/unlocking system of the gearbox is still in the locking position under the influence of the reaction spring of this system which counterbalances the pressure in the system.

When the hydraulic pressure increases beyond this closure pressure the servomotor starts to act and moves the hydropneumatic piston 40 towards the left, looking at the drawing in FIG. 2, under the double action of the hydraulic pressure and the pneumatic pressure.

The movement of the hydropneumatic piston 40 brings about the compression of the fluid contained in the chamber 58 and its flow under pressure through the pipe 60 towards the locking/unlocking system of the gearbox (not shown). The amount of fluid pumped towards the locking/unlocking system from the chamber 58 depends upon the travel of the piston 40. If this travel is insufficient to bring about declutching, the amount of fluid supplied to the locking/unlocking system will likewise be insufficient to cause unlocking of the gearbox. In this way perfect synchronization is ensured between the actuation of the clutch and the actuation of the gearbox.

Whatever the value of the pressure prevailing in the chamber 58 beyond the closure pressure which engages the sealing ring 92 in the bore 64, the plunger 62 remains axially immovable with respect to the piston 40 because the pressure in the chamber 58 which is exerted in the space lying defined by the sealing rings 92, 94, between the outer surface of the middle portion of slightly reduced area of the plunger 62 and the bore 64 by way of the communication orifices 82, acts upon equal areas on opposite sides of the said central portion of the plunger 62.

When the clutch pedal is released the piston 40 returns into the position represented in FIG. 2. During the course of this return movement the drop in hydraulic pressure acting upon the plunger 62 allows the return of the plunger into the position represented in FIG. 2 under the action of the spring 72. Communication is again established between the fluid inlet orifice 30 and the pipe 60; the pressure in the chamber 58 is then the rest pressure of the hydraulic control system which enables locking of the gearbox.

After long use of the clutch, wear of the friction linings obviously occurs, the rest position of the output rod 46 of the servomotor and hence the rest position of the piston 40 becomes displaced towards the stop 32, that is to say, towards the right hand portion of the drawing, looking at FIG. 2. This displacement caused by the wear in the friction linings of the clutch corresponds with the increase in the travel of the clutch plate the thickness of which is reduced by the said wear.

The position of rest of the piston 40 is displaced with the wear of the friction linings in the direction previously indicated until the time when the end of the piston 40 comes and blocks off the section of the bore 28 located immediately after the annular recess 90 at the level of the shoulder 96. Communication is then considerably reduced between the hydraulic fluid inlet orifice 30 and the orifice 34 which communicates with the chamber 38 where there is developed the pressure for control of the valve for opening the feed of compressed air. This restriction of the movement of fluid retards the operation of the pneumatic assistance and makes the movement of the clutch pedal much stiffer.

This initial stiffening of the pedal informs the user of the fact that the friction linings of the clutch have reached a critical wear and that these friction linings must be replaced. This stiffening does not, however, prevent still making a short use of the clutch before total deterioration of the friction linings and slipping of the clutch.

The ball 76 applied against the collar 74 by the spring 78 acts as an exhaust valve, preventing slowing down of the motion of the piston at the end of its return travel into the position of rest when the conditions are met which signal critical wear of the friction linings. Under these conditions the compressed fluid trapped between the head of the piston 40 and the portion of the bore 28 located after the shoulder 96 towards the collar 32 separates the ball 40 from its seat against the collar 74 and flows back freely towards the fluid inlet orifice 30.

As the wear of the friction linings of the clutch increases, the position of rest of the piston 40 will be displaced towards the right in FIG. 2 in its bore 28. Now this variation of the position of rest of the piston 40 or its initial position will not influence the travel of the said piston which will remain unchanged nor will it hinder the hydraulic control of the locking system of the gearbox. Consequently the synchronisation of the control of the locking system of the gearbox with that of the clutch will remain perfect.

When the wear of the clutch linings reaches a critical value the edge of the end face of the piston 43 comes and covers over the shoulder 96 existing at the edge of the annular recess 90 provided in the bore 28 and the flow of fluid is braked between the master cylinder and the piston which controls the pneumatic assistance. From the momentary absence of the latter results the stiffening of the pedal at the start of the process of declutching, which informs the driver of the wear of the linings.

I claim:

1. A hydropneumatic clutch control for a motor vehicle, comprising a casing provided with a bore which slidably receives a control piston, the latter being movable from a rest position under the influence of hydraulic pressure received in a chamber and with the assistance of a pneumatic motor, the latter being supplied with compressed air through a feed valve controlled by a second piston movable under the influence of the hydraulic pressure in said chamber, said vehicle comprising a source of pressurized fluid and a hydraulic utilizing circuit, said hydropneumatic clutch control being characterized in that said control piston comprises a larger diameter portion and a smaller diameter portion and defines with said bore an auxiliary chamber which communicates with said chamber through a pilot valve which is mounted in said control piston and which is normally open when the pressure prevailing in said chamber is substantially zero, said auxiliary chamber being connected to said utilizing circuit for supplying the latter with fluid under pressure when said control piston is displaced away from its rest position.

2. A hydropneumatic clutch control according to claim 1, characterized in that said pilot valve comprises a plunger slidably mounted in a bore in said control piston, one face of said plunger being subjected to the atmospheric pressure and to a resilient return force towards an abutment and the other face of said plunger being subjected to the pressure in said chamber, said plunger comprising a middle portion of reduced area which communicates with said auxiliary chamber through radial orifices in said control piston, and said piston bore comprising a portion of larger diameter opening towards said chamber, said middle portion of the plunger and said larger portion of the bore communicating with one another when said plunger rests on its abutment and being isolated from each other when said plunger is displaced away from its abutment.

3. A hydropneumatic clutch control according to claim 2, characterized in that said abutment comprises a collar fixed in said larger diameter portion of the piston bore, and a ball urged towards a central orifice of said collar by a spring guided in a blind bore in said plunger, radial holes in said control piston connecting said larger diameter portion of the piston bore and an outer annular groove provided in said larger diameter portion of said control piston.

4. A hydropneumatic clutch control according to claim 3, characterized in that said bore which slidably receives said control piston comprises an inner annular groove in which opens an inlet port connected to said source, whereby said inlet port is closed when said larger diameter portion of said control piston registers with said inner groove.

* * * * *